United States Patent
Kim et al.

(10) Patent No.: US 10,391,881 B2
(45) Date of Patent: Aug. 27, 2019

(54) VEHICLE HIGH VOLTAGE BATTERY APPARATUS WITH COOLING UNIT

(71) Applicants: Hyundai Motor Company, Seoul (KR); Kia Motors Corporation, Seoul (KR)

(72) Inventors: Min Wook Kim, Gyeonggi-do (KR); Jin Han Ahn, Gyeonggi-Do (KR); Yoon Cheol Jeon, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 11 days.

(21) Appl. No.: 15/656,497

(22) Filed: Jul. 21, 2017

(65) Prior Publication Data

US 2018/0170206 A1    Jun. 21, 2018

(30) Foreign Application Priority Data

Dec. 16, 2016 (KR) ........................ 10-2016-0172604

(51) Int. Cl.
*H01M 10/613* (2014.01)
*B60L 11/18* (2006.01)
*H01M 2/10* (2006.01)
*H01M 10/625* (2014.01)
*H01M 10/6568* (2014.01)
*B60K 1/04* (2019.01)
*H01M 10/6556* (2014.01)
*B60L 58/26* (2019.01)
*B60L 50/60* (2019.01)
*B60K 1/00* (2006.01)

(52) U.S. Cl.
CPC ............ *B60L 11/1874* (2013.01); *B60K 1/04* (2013.01); *B60L 50/66* (2019.02); *B60L 58/26* (2019.02); *H01M 2/1077* (2013.01); *H01M 2/1083* (2013.01); *H01M 10/613* (2015.04); *H01M 10/625* (2015.04); *H01M 10/6556* (2015.04); *H01M 10/6568* (2015.04); *B60K 2001/005* (2013.01); *B60K 2001/0438* (2013.01); *B60Y 2306/01* (2013.01); *H01M 2220/20* (2013.01)

(58) Field of Classification Search
None
See application file for complete search history.

(56) References Cited

U.S. PATENT DOCUMENTS

| 2006/0246348 | A1* | 11/2006 | Hamada | H01M 2/1072 429/148 |
| 2016/0064709 | A1* | 3/2016 | Miller | H01M 2/1077 429/100 |
| 2017/0033419 | A1* | 2/2017 | Eom | H01M 2/12 |

FOREIGN PATENT DOCUMENTS

KR    20130036824    4/2013

* cited by examiner

*Primary Examiner* — Lucas J. O'Donnell
(74) *Attorney, Agent, or Firm* — Mintz Levin Cohn Ferris Glovsky and Popeo, P.C.; Peter F. Corless

(57) ABSTRACT

A high voltage battery apparatus for a vehicle is provided. The battery apparatus is installed in a lower portion of the vehicle and includes a plurality of battery modules and a cooling unit that has a plurality of cavities in which the battery modules are inserted and fixed. The cooling unit has a hollow portion through which cooling water flows, thereby cooling the battery modules using the cooling water.

7 Claims, 5 Drawing Sheets

US 10,391,881 B2

VEHICLE HIGH VOLTAGE BATTERY APPARATUS WITH COOLING UNIT

CROSS REFERENCE TO RELATED APPLICATION

The present application claims priority to Korean Patent Application No. 10-2016-0172604, filed Dec. 16, 2016, the entire contents of which is incorporated herein for all purposes by this reference.

BACKGROUND

1. Field of the Invention

The present invention relates to a high voltage battery apparatus used in hybrid vehicles or electric vehicles, and more particularly, to a vehicle high voltage battery apparatus having high heat exchange efficiency between a cooling unit and a battery module, and having a reduced weight and volume.

2. Description of the Related Art

Eco-friendly vehicles such as electric vehicles and hybrid vehicles use a motor as a driving source, and an energy source of the motor is electricity. Therefore, batteries are mounted as an energy source within eco-friendly vehicles. A driving distance of eco-friendly vehicles is in proportion with the capacity of a battery pack mounted therein. Therefore, interest in a battery having a larger energy capacity has increased. However, the increase in battery capacity causes an increase in the amount of heat the batteries generate. When the heat is dissipated insufficiently, performance of batteries is deteriorated. Therefore, it is important that batteries are maintained at a proper temperature.

Conventional air cooling systems cool battery modules by forming an air channel between battery modules and circulating air through the air channel. However, in the conventional air cooling systems, while an internal space of a vehicle is limited, it is currently required to increase the number of battery modules mounted within a vehicle. Due to the limited space of a vehicle, it is difficult to form many air channels to cool a number of battery modules, which impedes improvement in cooling efficiency. Accordingly, a cooling unit using an indirect cooling system which cools battery modules using cooling water rather than using a direct cooling system has been suggested.

FIG. 1 is a cross-sectional view of a conventional vehicle high voltage battery apparatus including a cooling unit that uses an indirect cooling system according to the related art. As shown in FIG. 1, a conventional indirect cooling system using cooling water is structured with a cooling unit 21 fixed to a lower battery case 31 and respective side surfaces of battery modules 11 are fixed by a supporting frame 32 arranged on the lower battery case 31. However, the conventional indirect cooling system increases weight and volume of a vehicle high voltage battery apparatus due to the use of the supporting frame 32 used to assemble the battery modules 11 and the cooling unit 21 with each other and due to existence of a dead space at respective sides of the battery modules 11.

Moreover, the conventional cooling unit 21 may easily be damaged by an external impact since a vehicle high voltage battery apparatus equipped with the convention cooling unit is usually mounted in a lower portion of a vehicle. Accordingly, an undercover 41 is typically provided to surround a lower portion of a vehicle. However, this is a factor of deteriorating driving performance of a vehicle and increases cost of a vehicle.

The foregoing is intended merely to aid in the understanding of the background of the present invention, and is not intended to mean that the present invention falls within the purview of the related art that is already known to those skilled in the art.

SUMMARY

Accordingly, the present invention provides a vehicle high voltage battery apparatus having a structure that may increase efficiency of heat exchange between a cooling unit and a battery module and may effectively fix the battery module.

Another object of the present invention is to provide a vehicle high voltage battery apparatus having a reduced weight and volume, thereby improving driving performance of a vehicle. A further object of the present invention is to provide a vehicle high voltage battery apparatus having a modified structure that may reinforce a cooling unit without using an additional undercover.

According to one aspect a vehicle high voltage battery apparatus to be mounted in a lower portion of a vehicle may include: a plurality of battery modules; and a cooling unit having a plurality of cavities in which the battery modules are inserted and fixed and having a hollow portion through which cooling water flows, the cooling unit configured to cool the battery modules using the cooling water.

The cooling unit may include: a cooling plate through which the cooling water flows and with the cooling plate may include a plurality of fixing grooves in an upper surface thereof, the fixing grooves being spaced from each other by a distance that corresponds to a length of the battery modules; and a plurality of supporting blocks partially embedded in the respective fixing grooves, thereby defining the cavities therebetween. The cooling unit may further include a main frame through which the cooling water flows and that is arranged at an edge of the upper surface of the hollow cooling plate.

The hollow cooling plate may include: a hollow lower plate; a plurality of hollow upper plates in contact with lower surfaces of the battery modules to cool the battery modules, the hollow upper plates being arranged above and spaced from the hollow lower plate and providing the cavities thereon; a plurality of supporting members interposed between the hollow lower plate and the hollow upper plates to allow the hollow lower plate and the hollow upper plates to communicate with each other therethrough; and a plurality of cooling water supply and discharge members that branches off from the main cooling frame and through which the cooling water is supplied to and discharged from the hollow upper plates.

The cooling water supply and discharge members may be arranged to be in contact with ends of the battery modules to thus limit movement of the battery modules, disposed on the hollow upper plates, in a longitudinal direction of the battery modules. The hollow upper plate may be made of aluminum. The hollow lower plate and the supporting members may be made of a material having higher strength than the hollow upper plate. The battery modules may be equipped with respective fixing brackets that extend from the respective battery modules to upper surfaces of the supporting blocks and are fixed to the supporting blocks.

According to an exemplary embodiment of the present invention, it may be possible to facilitate assembling of a vehicle high voltage battery apparatus and improve cooling efficiency of a vehicle high voltage battery apparatus. In addition, according to the present invention, it may be possible to minimize a dead space in a vehicle high voltage battery apparatus. It may also be possible to reinforce a cooling unit of a vehicle high voltage battery apparatus, without using an undercover. The reinforced structure reduces a weight and volume of a vehicle high voltage battery apparatus, which improves driving performance of a vehicle.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments will be described more fully herein with reference to the accompanying drawings. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. Throughout the drawings, like reference numbers refer to like elements.

A vehicle high voltage battery apparatus according to one exemplary embodiment of the present invention is equipped with a cooling unit to improve cooling efficiency. Thus, the cooling unit may be configured to effectively cool a plurality of battery modules and does not require a protective undercover that is conventionally used for the purpose of protection of the cooling unit. The structure of the present invention thus minimizes a dead space in a battery apparatus and reduces an overall weight and volume of a battery apparatus.

Figure 1:
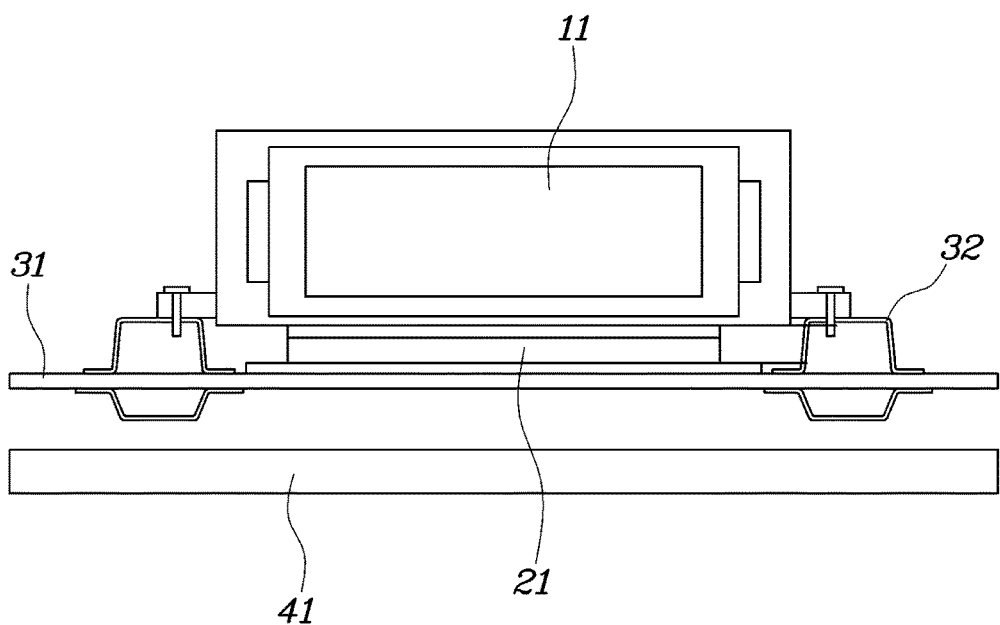
FIG. 1 is a cross-sectional view of a vehicle high voltage battery apparatus equipped with a conventional cooling unit that performs indirect cooling according to the related art.
Figure 2:
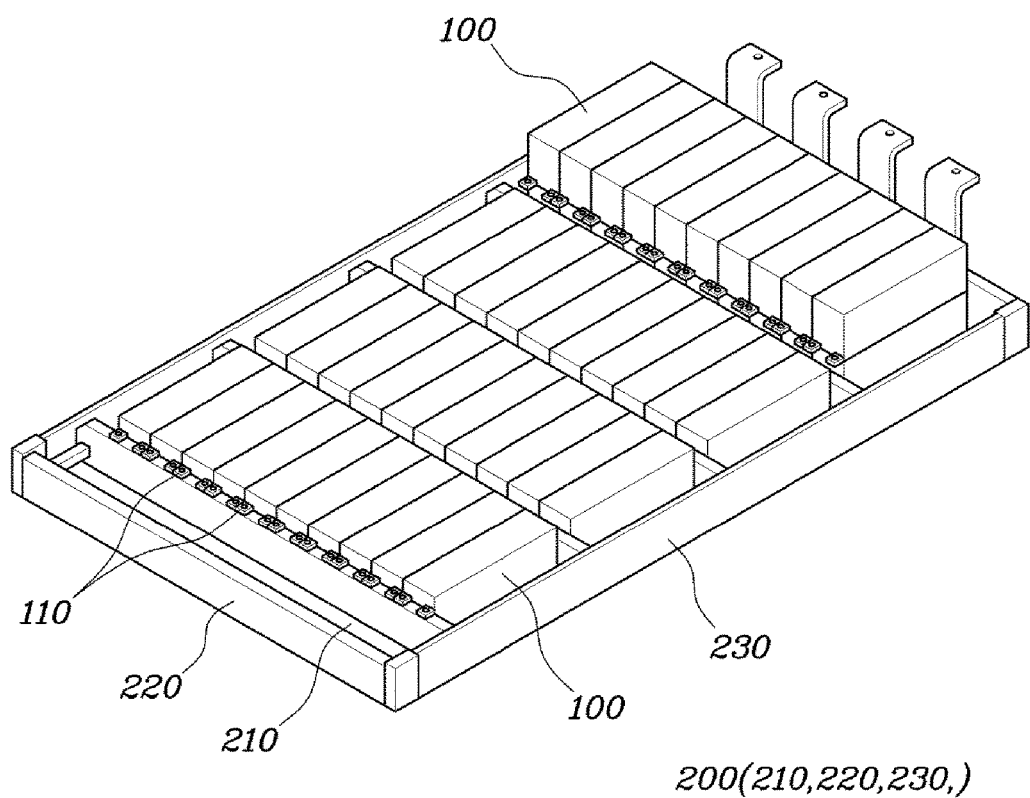
FIG. 2 is a perspective view of a vehicle high voltage battery apparatus according to one exemplary embodiment of the present invention.

FIG. 2 is a perspective view illustrating a vehicle high voltage battery apparatus according to one exemplary embodiment of the present invention. As shown in FIG. 2, according to the exemplary embodiment of the present invention, a vehicle high voltage battery apparatus may include a plurality of battery modules 100 and a cooling unit 200 in which the battery modules 100 are fixedly installed and the cooling unit 200 may be configured to cool the battery modules 100 using cooling water. The cooling unit 200 may include a plurality of cavities 240 having a width that corresponds to a length of the battery modules 100. The cavities 240 may be arranged in a longitudinal direction of the cooling unit 200. The battery modules 100 may be inserted into the cavities 240 and fixed not to move in the cavities 240.

Figure 3:
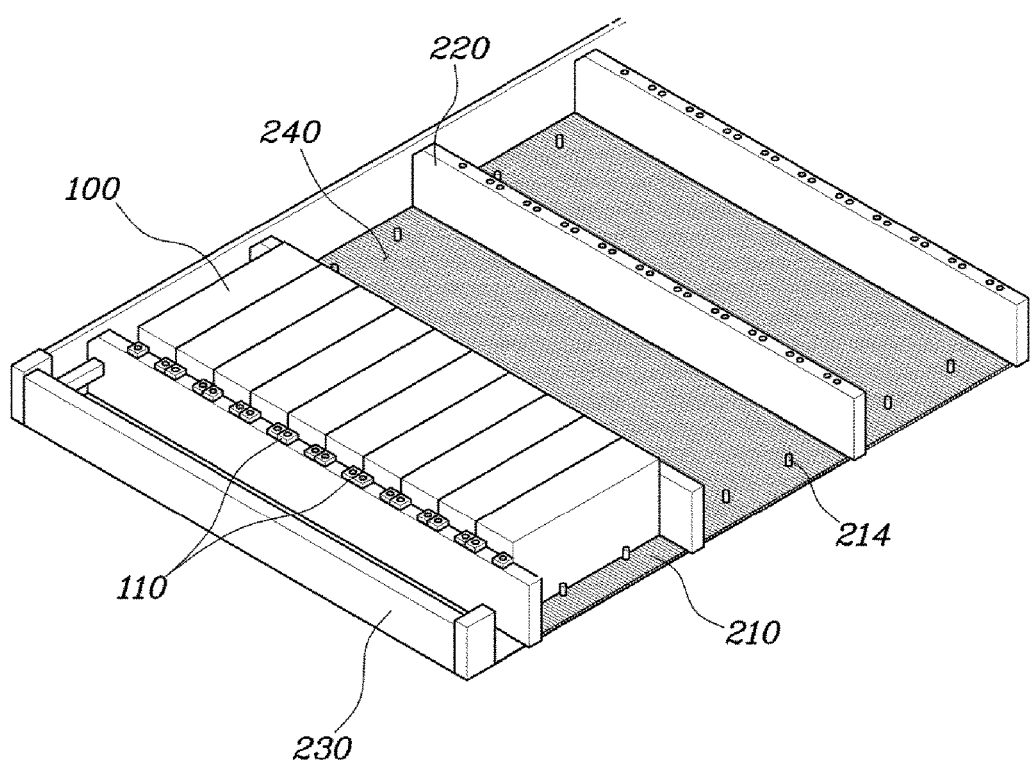
FIG. 3 is a perspective view illustrating an assembled structure of battery modules and a cooling unit according to the exemplary embodiment of the present invention.
Figure 4:
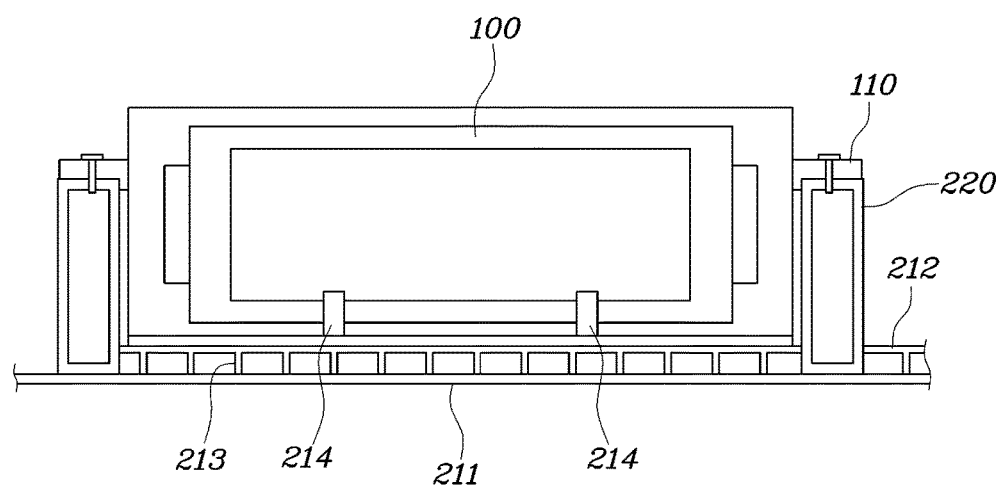
FIG. 4 is a cross-sectional view of the vehicle high voltage battery apparatus according to the exemplary embodiment of the present invention.

FIG. 3 illustrates an assembled structure of the battery modules and the cooling unit according to the exemplary embodiment of the present invention, and FIG. 4 is a cross-sectional view showing the vehicle high voltage battery apparatus according to the exemplary embodiment of the present invention. As shown in FIGS. 3 and 4, according to the exemplary embodiment of the present invention, the cooling unit 200 may include: a cooling plate 210 having a plurality of fixing grooves 210a arranged in a longitudinal direction of the cooling plate 210; and a plurality of supporting blocks 220 partially embedded in the respective fixing grooves 210a to define the cavities 240 therebetween.

According to the exemplary embodiment of the present invention, the cooling unit 200 may further include a main cooling frame 230 disposed upright at the edges of the cooling plate 210 like a fence to securely fix the battery modules 100 inserted in the cavities 240 defined by the supporting blocks 220. The cooling frame 230 has a frame shape and may surround the battery modules 100 and the cooling plate 210 at the edges. In particular, the cooling frame 230 may be a ring-shaped hollow frame with a channel inside thereof and the channel may be in communication with an internal space of the cooling plate 210. Therefore, cooling water may flow between the cooling frame 230 and the cooling plate 210. The cooling frame 230 has an effect of increasing a heat exchange area across which heat exchange with the battery modules 100 occurs.

Figure 5:
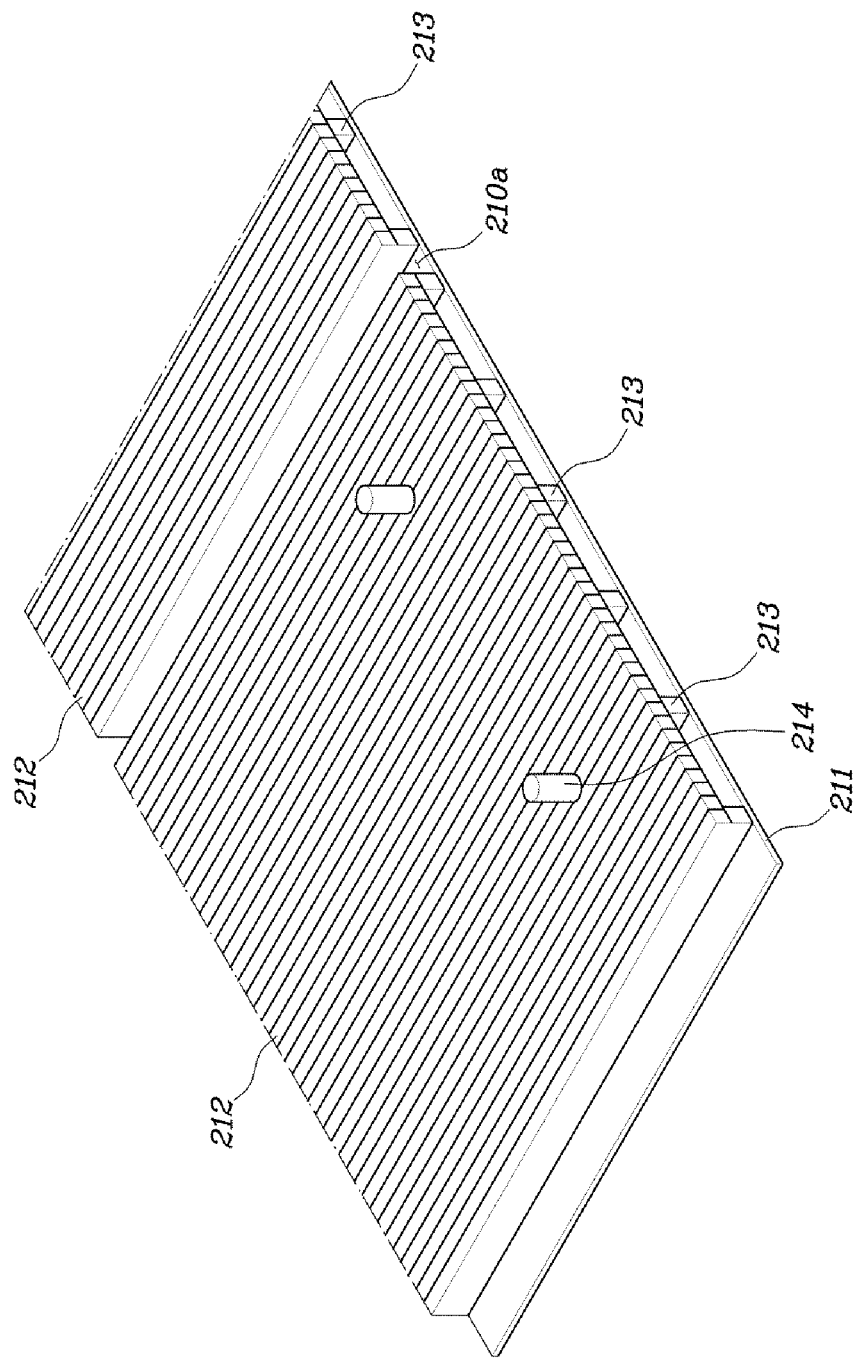
FIG. 5 is a perspective view of a cooling plate according to the exemplary embodiment of the present invention.

FIG. 5 is a diagram for describing the cooling plate according to one exemplary embodiment of the present invention. As shown in FIG. 5, according to the exemplary embodiment of the present invention, the cooling plate 210 may include a hollow lower plate 211 and a plurality of hollow upper plates 212 arranged above the hollow lower plate 211 in a longitudinal direction of the cooling unit 200. The hollow upper plates 212 have a width about equal to that of the battery modules 100. The cooling plate 210 may further include a plurality of supporting members 213 installed between the hollow upper plates 212 and the hollow lower plate 211 and a plurality of cooling water supply and discharge members 214 through which cooling water may be supplied to the hollow upper plates 212 and may be discharged to an outside from the hollow upper plates 212.

Each hollow upper plate 212 has an internal space through which cooling water may flow. The hollow upper plates 212 may be in contact with lower surfaces of the battery module 100 arranged on upper surfaces thereof to thus cool the battery modules 100. Therefore, the hollow upper plates 211 may be made of a highly thermally conductive material such as aluminum or aluminum alloys. Accordingly, the battery modules may be highly effectively cooled.

Accordingly to the exemplary embodiment of the present invention, the hollow lower plate 211 has an internal channel through which cooling water may flow and a sufficient length to accommodate the multiple hollow upper plates 212 thereon in a longitudinal direction thereof. The hollow lower plate 211 may be combined with the hollow upper plates 212 via the multiple supporting members 213 interposed therebetween.

The hollow upper plates 212 and the hollow lower plate 211 may be in communication with each other via the supporting members 213 that are ring-shaped hollow members and thus, cooling water may flow back and forth between the internal space of the hollow upper plates 212 and the internal space of the hollow lower plate 211. Since the supporting members 213 function as a reinforcing member that reinforces the hollow upper plates 212 and the hollow lower plate 211, it is not necessary to use an additional undercover which is typically arranged under the cooling unit 200 for the purpose of protection of the cooling unit 200 in the conventional art. The structure not including an undercover of the present invention has an effect of reducing a weight and volume of a vehicle high voltage battery apparatus.

Moreover, since the hollow upper plates 212 and the hollow lower plate 211 may be in communication with each other, when the cooling plate 210 is damaged due to collision with an object, cooling water in the cooling plate 210 may be immediately discharged at the time of collision. Therefore, it may be possible to solve a problem with conventional cooling unit in which cooling water leaking from the conventional cooling unit that is damaged is collected on an undercover, causing short-circuiting of battery modules. Accordingly, the present invention is capable of preventing accidents attributable to battery failure.

Furthermore, the hollow lower plate 211 and the supporting members 213 may be made of carbon steel or stainless steel that has higher strength than a material of the hollow upper plates 212. The hollow lower plate 211 and the supporting members 213 are component parts that are not in direct contact with the battery modules 100 and thus do not perform heat exchange with the battery modules 100 but have to minimize an impact when a vehicle collides with an object during driving of the vehicle.

According to the exemplary embodiment of the present invention, the cooling water supply and discharge members 214 are elements through which cooling water may be introduced into the internal space of the cooling plate 210 and discharged from the cooling plate 210. The cooling water supply and discharge members 214 may be installed on the top of the hollow upper plates 212 and may be in contact with (e.g., abut) the ends of the battery modules 100 to thus restrict movement of battery modules 100 in a longitudinal direction of the battery modules, i.e., a widthwise direction of the cooling unit 200. Accordingly, the battery modules 100 may be more securely fixed.

According to the exemplary embodiment of the present invention, a plurality of fixing brackets 110 may extend from the side surfaces of the battery modules 100 to the upper surfaces of the supporting blocks 220. The fixing brackets 110 may be fixed to the supporting blocks 220 by a welding method or using bolts. The fixing brackets 110 have an effect of more securely fixing the battery modules 100, thereby preventing the battery modules 100 from escaping from the cavities 240.

As described above, according to the exemplary embodiment of the present invention, the cooling unit 200 has an improved structure that more securely fixes the battery modules 100, increases cooling efficiency, and enhances mechanical strength thereof. Therefore, the cooling unit 200 does not require an additional undercover, which reduces a weight and volume, and a manufacturing cost of a vehicle high voltage battery apparatus.

Although an exemplary embodiment of the present invention has been described for illustrative purposes, the present invention should not be limited to the exemplary embodiment but be defined by the accompanying claims. Accordingly, those skilled in the art will appreciate that various modifications, additions and substitutions are possible, without departing from the scope and spirit of the invention as disclosed in the accompanying claims.

What is claimed is:

1. A vehicle high voltage battery apparatus to be mounted in a lower portion of a vehicle, the battery apparatus comprising:
    a plurality of battery modules; and
    a cooling unit having a plurality of cavities in which the battery modules are inserted and fixed, and having a hollow portion through which cooling water flows,
    wherein the cooling unit is configured to cool the battery modules using the cooling water,
    wherein the cooling unit includes:
        a cooling plate through which the cooling water flows and having a plurality of fixing grooves in an upper surface thereof, the fixing grooves being spaced from each other by a distance that corresponds to a length of the battery modules; and
        a main cooling frame through which the cooling water flows and that is arranged at an edge of the upper surface of the hollow cooling plate, and
    wherein the hollow cooling plate includes:
        a hollow lower plate;
        a plurality of hollow upper plates in contact with lower surfaces of the battery modules to cool the battery modules, the hollow upper plates being arranged above and spaced from the hollow lower plate and providing the cavities thereon;
        a plurality of supporting members interposed between the hollow lower plate and the hollow upper plates to allow the hollow lower plate and the hollow upper plates to communicate with each other therethrough; and
        a plurality of cooling water supply and discharge members that branches off from the main cooling frame and through which the cooling water is supplied to and discharged from the hollow upper plates.

2. The battery apparatus according to claim 1, wherein the cooling unit further includes:
a plurality of supporting blocks partially embedded in the respective fixing grooves to define the cavities therebetween.

3. The battery apparatus according to claim 1, wherein the cooling water supply and discharge members are arranged in contact with ends of the battery modules to limit movement of the battery modules, provided on the hollow upper plates, in a longitudinal direction of the battery modules.

4. The battery apparatus according to claim 1, wherein the hollow upper plate is made of aluminum.

5. The battery apparatus according to claim 4, wherein the hollow lower plate and the supporting members are made of a material having higher strength than the hollow upper plate.

6. The battery apparatus according to claim 2, wherein the battery modules are equipped with respective fixing brackets that extend from the respective battery modules to upper surfaces of the supporting blocks and are fixed to the supporting blocks.

7. The battery apparatus according to claim 1, wherein the cooling frame is a ring-shaped hollow frame with a channel disposed there through and the channel is in communication with an internal space of the cooling plate.

* * * * *